US010600529B2

(12) United States Patent
Butts et al.

(10) Patent No.: US 10,600,529 B2
(45) Date of Patent: Mar. 24, 2020

(54) METHOD OF MANUFACTURING A RADIATION SOURCE

(71) Applicants: General Electric Company, Schenectady, NY (US); Medi-Physics Inc., Princeton, NJ (US)

(72) Inventors: Matthew David Butts, Niskayuna, NY (US); Charles E. Shanks, Arlington Heights, IL (US)

(73) Assignees: General Electric Company, Schenectady, NY (US); Medi-Physics Inc., Princeton, NJ (US)

( * ) Notice: Subject to any disclaimer, the term of this patent is extended or adjusted under 35 U.S.C. 154(b) by 152 days.

(21) Appl. No.: 15/532,089

(22) PCT Filed: Dec. 4, 2015

(86) PCT No.: PCT/EP2015/078713
§ 371 (c)(1),
(2) Date: May 31, 2017

(87) PCT Pub. No.: WO2016/087660
PCT Pub. Date: Jun. 9, 2016

(65) Prior Publication Data
US 2017/0271038 A1    Sep. 21, 2017

Related U.S. Application Data

(60) Provisional application No. 62/087,321, filed on Dec. 4, 2014.

(51) Int. Cl.
*G21G 4/06* (2006.01)
*G21G 4/08* (2006.01)
(Continued)

(52) U.S. Cl.
CPC ............... *G21G 4/06* (2013.01); *G21G 1/001* (2013.01); *G21G 1/02* (2013.01); *G21G 4/08* (2013.01);
(Continued)

(58) Field of Classification Search
CPC ............ G21G 4/06; G21G 1/001; G21G 1/02; G21G 4/08; G21G 1/06; G21G 2001/0094;
(Continued)

(56) References Cited

U.S. PATENT DOCUMENTS

| 4,683,123 A * | 7/1987 | Knapp ................ G21G 4/08 |
| | | 250/432 PD |
| 2010/0294956 A1 | 11/2010 | Maulard |
| 2013/0108525 A1 | 5/2013 | Engelbrecht |

FOREIGN PATENT DOCUMENTS

| CN | 1303513 A | 7/2001 |
| GB | 962582 A | 7/1964 |

(Continued)

OTHER PUBLICATIONS

International Search Report and the Written Opinion of the International Searching Authority, or the Declaration from International Appl. No. PCT/EP2015/078713, dated Feb. 23, 2016.
(Continued)

*Primary Examiner* — Jack W Keith
*Assistant Examiner* — Daniel Wasil
(74) *Attorney, Agent, or Firm* — Arent Fox, LLP

(57) ABSTRACT

An equatorial anthropic radiation source and a method of making an equatorial anthropic radiation source are described. The radiation source is useful in diagnostic imaging applications in healthcare or other industries (e.g. computerized three-dimensional segmental imaging; Crompton scattering imaging techniques; radiation detector check and calibration, in particular CdZnTe detectors commonly used in medical imaging).

8 Claims, 4 Drawing Sheets

(51) Int. Cl.
_G21G 1/00_ (2006.01)
_G21G 1/02_ (2006.01)
_G21G 1/06_ (2006.01)
_B29C 39/00_ (2006.01)
_B29K 63/00_ (2006.01)
_B29K 505/08_ (2006.01)

(52) U.S. Cl.
CPC ........ _B29C 39/003_ (2013.01); _B29K 2063/00_ (2013.01); _B29K 2505/08_ (2013.01); _G21G 1/06_ (2013.01); _G21G 2001/0094_ (2013.01)

(58) Field of Classification Search
CPC .............. B29C 39/003; B29K 2063/00; B29K 2505/08
USPC ........... 376/189; 430/953; 427/5; 250/493.1; 264/0.5; 423/5; 600/1
See application file for complete search history.

(56) References Cited

FOREIGN PATENT DOCUMENTS

| | | |
|---|---|---|
| JP | 2011506918 A | 3/2011 |
| WO | 2016087660 A1 | 6/2016 |

OTHER PUBLICATIONS

China First Office Action corresponding to Chinese Application No. 201580065874.8, dated Dec. 4, 2018.
China First Search Report corresponding to Chinese Appplication No. 201580065874.8, dated Nov. 29, 2018.
Japan Notice of Reasons for Rejection corresponding to Japanese Application No. 2017-527843, dated Aug. 27, 2019.

\* cited by examiner

METHOD OF MANUFACTURING A RADIATION SOURCE

CROSS-REFERENCE TO RELATED APPLICATIONS

This application is a filing under 35 U.S.C. 371 of international application No. PCT/EP2015/078713, filed Dec. 4, 2015, which claims priority to U.S. Provisional Application No. 62/087,321 filed on Dec. 4, 2014, the entire disclosures of each of which are hereby incorporated by reference.

FIELD OF THE INVENTION

The present invention relates to the development of a radiation source and a method for the preparation of such a radiation source. In particular, the present invention provides a method for the preparation of an equatorial anthropic radiation source comprising osmium 191 ($^{191}$Os).

BACKGROUND OF THE INVENTION

There still exists a need in the art for a method of manufacturing a radiation source. In particular, there still exists a need in the art for a robust, scalable method for manufacturing radiation sources comprising radioactive particles uniformly dispersed in a fixed matrix. Previous methods failed to achieve uniform radiation sources. In particular, there still exists a need in the art for a method of manufacturing a radiation source comprising $^{191}$Os. In particular, there still exists a need in the art for a method of manufacturing a radiation source comprising $^{191}$Os that is robust and scalable. The present invention answers such needs.

SUMMARY OF THE INVENTION

The present invention is directed to a method for the preparation of a radiation source as described herein.

A method of the invention provides a finished radiation source achieving radiation isotropy, each as described herein, which is a critical technical need. A method of the invention, as described herein, provides control over radioactive particle dispersion which is not easily achievable with particles suspended within a low density radio-opaque matrix material while curing/hardening/setting.

As would be understood by one of skill in the art, radio-opaque matrix material by definition is a low density material capable of suspending high density material (e.g., osmium, tungsten, other isotope particles) without settling.

The present invention is further directed to a radiation source.

The present invention is further directed to a radiation source comprising a radioactive powder dispersed in a radio-opaque matrix.

The present invention is further directed to a radiation source composition, comprising an insoluble radioactive substance uniformly dispersed in a fixed low density radio-opaque matrix material.

The present invention is further directed to the radiation source of the invention encapsulated in a capsule.

These and other aspects of the invention will become apparent from the following detailed description of the preferred embodiments, taken in conjunction with the figures.

DETAILED DESCRIPTION OF THE PREFERRED EMBODIMENTS

Figure 1:
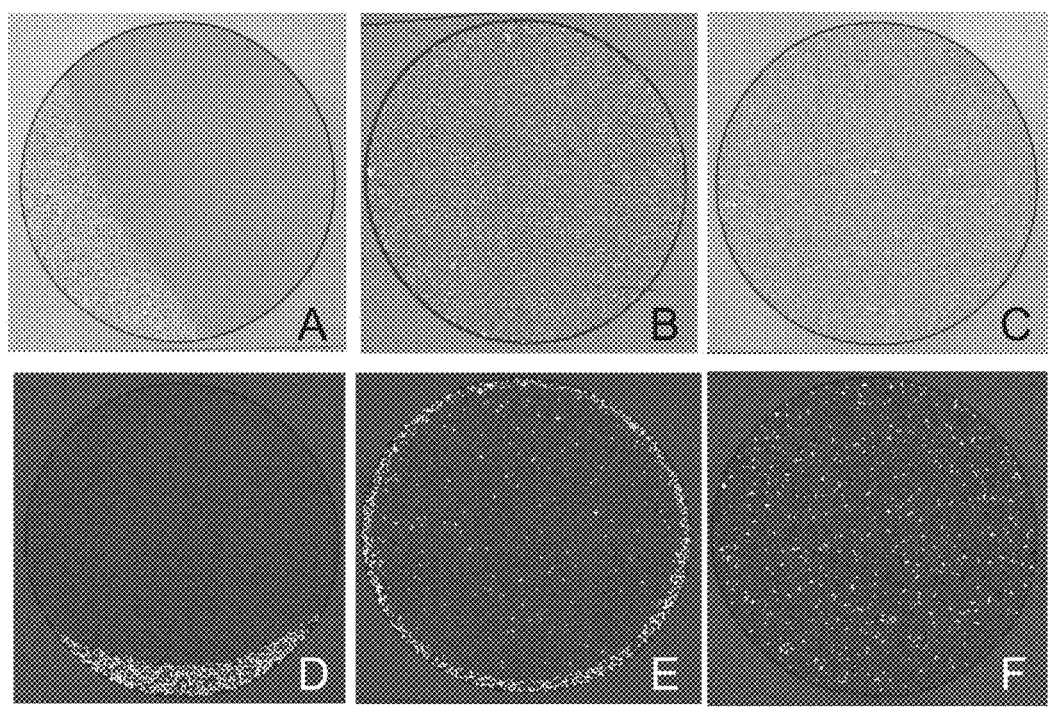
FIG. 1 depicts images of cross-section of cured rods prepared according to an exemplary method of the invention compared to images of cross-section of cured rods prepared by a different method.

A method of the invention, as described herein, provides many advantages and/or solutions over previous methods that attempted to achieve uniform sources including, but not limited to, (i) providing a solution to making uniform sources when the radioactive substance of choice, as described herein, cannot be easily dissolved into the desired matrix, as described herein, and thus subsequently cannot be mixed homogenously for transport to a suitable mold, as described herein, for curing; (ii) providing a method of ensuring uniform distribution of particles of varying sizes that can be maintained during curing/setting/hardening of a suitable support matrix in a mold of the desired shape (e.g. a cylinder), each as defined herein, which is particularly important for a support matrix of lower density than the radioactive substance of choice; and (iii) providing a high volume, cost effective manufacturing method.

A method of the invention, as described herein, provides for the manufacture of a radiation source in a desired shape. A method of the invention, as described herein, provides a scalable robust method of manufacturing a radiation source, as described herein.

The Method

The present invention provides a method for the preparation of a radiation source comprising the step of immobilizing a radioactive substance in a support matrix to form a dispersion. According to the invention, the dispersion provides radiation isotropy and does not quench the radioactivity of the radioactive substance.

The present invention provides a method for the preparation of a radiation source comprising the following steps:
(i) curing said formulation in said mold into rod shaped parts; and
(ii) cutting cured rods to form at least one radiation source suitable for diagnostic imaging applications.

The present invention provides a method for the preparation of a radiation source comprising the following steps:
(i) mixing radioactive particles into a curable resin to create a formulation;
(ii) placing said formulation into a cylindrically shaped mold;
(iii) curing said formulation in said mold into rod shaped parts; and
(iv) cutting cured rods to form at least one radiation source suitable for diagnostic imaging applications.

The present invention provides a method for the preparation of a radiation source comprising the following steps:
(i) irradiating enriched $^{190}$Os to form a mixture comprising $^{191}$Os;
(ii) oxidizing said mixture to produce gaseous OsO$_4$;
(iii) trapping said gaseous OsO$_4$ in aqueous base followed by an osmium reduction step to precipitate osmate as osmate particles;

(iv) formulating said osmate particles into an epoxy matrix to form a formulation;

(v) placing said formulation into a mold;

(vi) curing said formulation in said mold into epoxy rods; and (vii) cutting said epoxy rods to form cut epoxy rods.

The present invention provides a radiation source prepared by a method of the invention, each as described herein.

The present invention provides a radiation source comprising a radioactive substance immobilized or dispersed in a support matrix.

The present invention provides a radiation source comprising a radioactive substance immobilized or dispersed in a support matrix, wherein said radioactive substance is $^{191}$Os and said support matrix is a curable resin or a resin that can be hardened.

Figure 3:
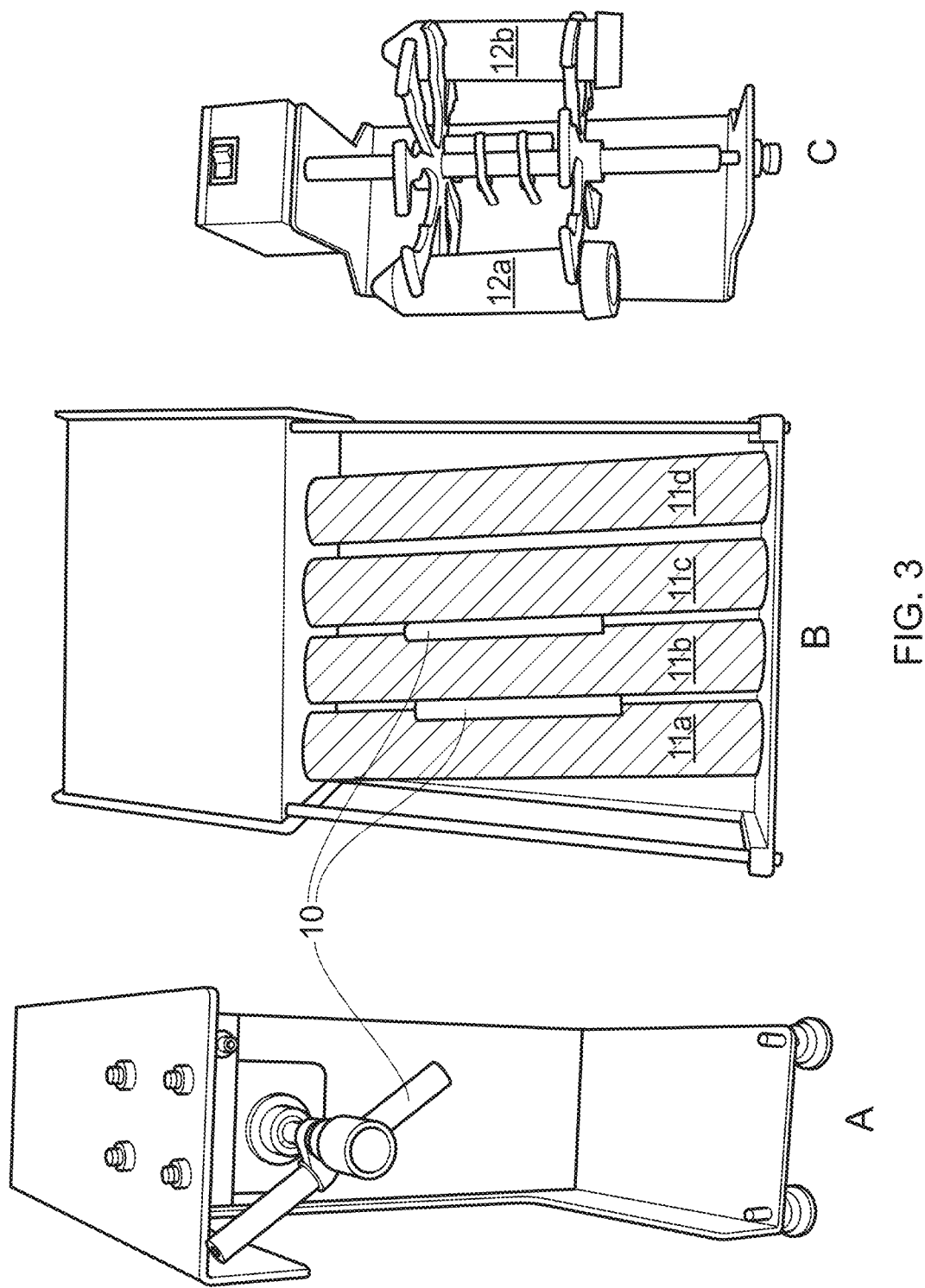
FIG. 3 illustrates various apparatus used for mixing.

Example 1 describes a non-limiting embodiment of the method of the present invention, which was compared with prior methods. The results are illustrated in FIG. 1. FIGS. 1A, B and C depict dispersions of tungsten particles with an average diameter of 2.4+/−1.4 um. FIGS. 1D, E and F depict dispersions of tungsten particles with an average diameter of 6.3+/−4.0 um. Dispersions illustrated in FIGS. 1A and 1D were generated by allowing the particle-containing formulations to cure in stationary rod-shaped molds with no mixing according to a prior method. Dispersions illustrated in FIGS. 1B and 1E were generated using the mixing apparatus shown in FIG. 3B. Dispersions illustrated in FIGS. 1C and 1F were generated using the mixing apparatus shown in FIG. 3C.

The Radiation Source

According to the invention, the radiation source is a material comprising a radioactive substance immobilized or dispersed in a support matrix. According to the invention, the dispersion of the radiation source is maximized to (a) reduce quenching of radioactivity to avoid higher loading and (b) provide radiation isotropy, preferably equatorially. According to the invention, avoiding higher loading results in reducing cost and radioactive waste in the process. In a preferred embodiment, the radioactive substance is dispersed in the support matrix. In a preferred embodiment, the radioactive substance is uniformly dispersed in the support matrix. In a preferred embodiment, the radioactive source is obtained according to the method of the invention as set forth herein. In a preferred embodiment, the radioactive source is cured. In a preferred embodiment, the radioactive source is delivered in the form of a rod. In a preferred embodiment, the radioactive source is delivered in the form of a cured rod. The uniform rod sizing facilitates automated machine handling and assembly into the final device/source holder or machine of choice.

The Radioactive Substance

The radioactive substance can be any radioactive isotope or a compound comprising a radioactive isotope, or mixtures thereof, which have diagnostic imaging utility. In a preferred embodiment, the radioactive substance is osmium or tungsten, or any low energy radio-isotope. In a preferred embodiment, the radioactive substance is $^{191}$Os or a compound of $^{191}$Os. In a preferred embodiment, the radioactive substance is in the form of a powder comprising particles. The average particle size of the radioactive particles is in the range of about 100 nm and about 100 μm, preferably in the range of about 500 nm and 20 μm and most preferably in the range of about 1 μm and 15 μm.

In a preferred embodiment, the particles of the radioactive substance are uniformly and evenly dispersed in a support matrix as described herein (see FIG. 1, images B, C, F).

In a preferred embodiment, the particles of the radioactive substance are uniformly dispersed in a support matrix based on particle weight and size such that different dispersion patterns can be achieved as desired (see FIG. 1, image E).

The Support Matrix

According to the invention the support matrix can be any material that can immobilize the radioactive substance as described herein. In a preferred embodiment, the support matrix is a radio-opaque matrix. In a preferred embodiment, the support matrix is a resin. In a preferred embodiment, the support matrix is an epoxy resin. The radioactive substance of the present invention is mixed into a curable support matrix to create a formulation. In a preferred embodiment the support matrix is a curable support matrix. The curable support matrix is any composition which can be hardened, is radio-opaque and which does not prevent the radioactive particles from being useful for imaging applications, or degrade rapidly in physical form upon exposure to produced radiation over the useful lifetime of the radiation source. The curable support matrix should further be chosen from compositions which can be cured at room temperature, elevated temperature, exposure to moisture or exposure to a catalyst after time such as that which is sufficient to achieve mixing of the radioactive particles into the curable matrix. Any suitable one part or two part curable support matrix can be used provided that it meets these basic requirements. In preferred embodiments, the curable support matrix comprises an epoxy resin which cures at room temperature or elevated temperature. Most preferably, the curable support matrix comprises a two part epoxy which cures at room temperature. As one skilled in the art will recognize, other curable resins known in the art including moisture cure or addition cure systems, and or low density media that can be solidified to provide a support matrix.

The Mold

According to the invention the mold can by any mold known in the art capable of holding the dispersion comprising the radioactive substance and the support matrix, each as described herein, and capable of withstanding the curing step, as described herein. According to the invention the mold comprises at least one size dimension suitable for the desired imaging application, and has little to no affinity for the cured dispersion and thus is easy to remove from the cured part. In a preferred embodiment, the mold is a Teflon mold. According to the invention, the Teflon mold can by any shape. In a preferred embodiment, the mold is a Teflon tube. In a preferred embodiment, the mold is a disposable Teflon tube or sheath. In a preferred embodiment, the mold is a Teflon tube such that rod shapes can be made. Mold removal can be achieved by using any means known in the art (e.g. a razor blade to cut away the mold and pull away the cured part).

Irradiating Step

According to the invention, the irradiating step may be achieved by any means known in the art. A viable method of producing $^{191}$Os is by the neutron irradiation of enriched $^{190}$Os [$^{190}$Os n,γ $^{191}$Os] in a nuclear reactor with a typical neutron flux in the range of $1\times10^{14}$ neutrons per $cm^2$ per second to $5\times10^{15}$ neutrons per $cm^2$ per second to provide suitable quantities of $^{191}$Os.

Oxidizing Step

According to the invention, the oxidizing step may be achieved by any means known in the art. Examples of suitable oxidizing methods include, but are not limited to, concentrated acid (see e.g., G. W. Leddicotte, *The radiochemistry of osmium*, National Academy of Sciences—National Research Council, 3046, October 1961), sodium hypochlorite or other suitable oxidizing agents as listed in US20130108525, herein incorporated by reference.

Trapping Step

According to the invention, the trapping step may be achieved by any means known in the art. An example of a suitable trapping method includes, but is not limited to, exposure to aqueous potassium hydroxide to form a perosmate species (see, e.g., Nuclear Medicine Progress Report ORNL/TM-10711, 1987, and US20130108525).

Reduction Step

According to the invention, the trapping step may be followed by an osmium reduction step to precipitate osmate as osmate particles. This reduction step can be achieved by any means known in the art. Examples of suitable reduction methods include exposure of the perosmate to sulfur reducing agents such as NaSH or an alcohol such as ethanol (see, e.g. G. W. Leddicotte, *The radiochemistry of osmium*, National Academy of Sciences—National Research Council, 3046, October 1961; Packard, A. B.; Treves, S. T.; O'Brien, G. M.; Lim, K. S. *J. Nucl. Med.* 1987, 28, 1571, and US20130108525).

Formulating Step

According to the invention, the formulating step may be achieved by any means known in the art. The radioactive substance can be mixed into the curable resin to create a formulation by agitation, by using a stirring device, by sonication or any combination of these methods. In some embodiments, the particle/resin system is evacuated, such as by subjecting it to an atmosphere of reduced pressure, optionally with simultaneous agitation or stirring, to reduce or eliminate the presence of air or gas bubbles. In other embodiments, a double barrel delivery device to which is fixed a disposable static mixer is used. In this scenario, one barrel is charged with resin part A, the other barrel is charged with resin part B, and the radioactive substance is mixed in with either part A or part B, or both. Pressure applied to the double barrel results in mixing of the formulation components in the static mixer and delivery to the mold at the far end of the static mixer. In other embodiments, other types of extruders may be used to prepare the formulation for charging into the mold.

Molding Step

According to the invention, the molding step is achieved by placing the formulated dispersion in a mold, each as described herein. In one embodiment, the mold is charged with formulation using a syringe, optionally following final mixing via the syringe. In other embodiments, the formulation is added to the mold via the double barrel delivery device attached to a static mixer as described above. Larger scale production may, in some embodiments, include the use of other extruder devices to load the mold. In some embodiments, pressure is used to deliver the formulation to the mold. In other embodiments, a vacuum is applied to one end of the mold to pull the formulation into the mold. In a preferred embodiment, the ends of the filled mold (e.g. Teflon tube) are blocked with silicone grease or any one of other high viscosity greases or pastes to prevent leakage during the curing step, as described herein.

Curing Step

According to the invention, the curing step is achieved by a means that stabilizes the dispersion of the radioactive substance in the formulation, until such time as it is fixed in place by the phenomena of curing. In one embodiment said curing step comprises mixing said formulation in said mold, which acts to maintain and/or control particle dispersion. Non-limiting examples of suitable means for carrying out the curing step with mixing which maintain and lock in uniform dispersion of the particles include those depicted in FIG. 3. In each of FIGS. 3A-C a mold filled with a formulated dispersion as defined herein is placed into glass rods (10 in FIGS. 3A and 3B, contained within plastic tubes 12a and 12b in FIG. 3C) and rotated under different conditions. In the method illustrated in FIG. 3A mixing is achieved by end over end rotation. In the method illustrated in FIG. 3B mixing is achieved by horizontal rolling where the glass rods are placed on a series of rollers 11a-d. In the method illustrated in FIG. 3C the plastic tubes 12a and 12b containing the glass rods (immobilized within the plastic tubes e.g. using tissue wadding) are rotated about a long axis to effect mixing. The method is chosen to provide a desired dispersion characteristic. In one embodiment, such as for example in the case of a rod shaped part, the substance dispersion is uniform longitudinally, down the length of the rod, as well as across the cross section of the cured part. In other embodiments, the curing step is carried out under conditions that result in a cured part in which the substance dispersion is uniform longitudinally, down the length of the rod (i.e. there is no particle concentration gradient down the length of the rod), but preferentially and uniformly towards the circumference of the cross section (see e.g., FIG. 1E, where there is a concentration gradient from the center of the part to the outer rim). In a preferred embodiment, the dispersion comprises osmium and epoxy. The term "comprises osmium" used throughout this document is intended to encompass wherein said osmium is present as a compound of osmium. In a preferred embodiment, the dispersion comprises tungsten and epoxy.

Cutting Step

According the invention, the cured molded dispersion comprising the radioactive substance and the support matrix can be cut into desired shapes using any means known in the art. Examples of suitable cutting methods and/or devices include, but are not limited to, an escapement gate and shear cutter.

Figure 4:
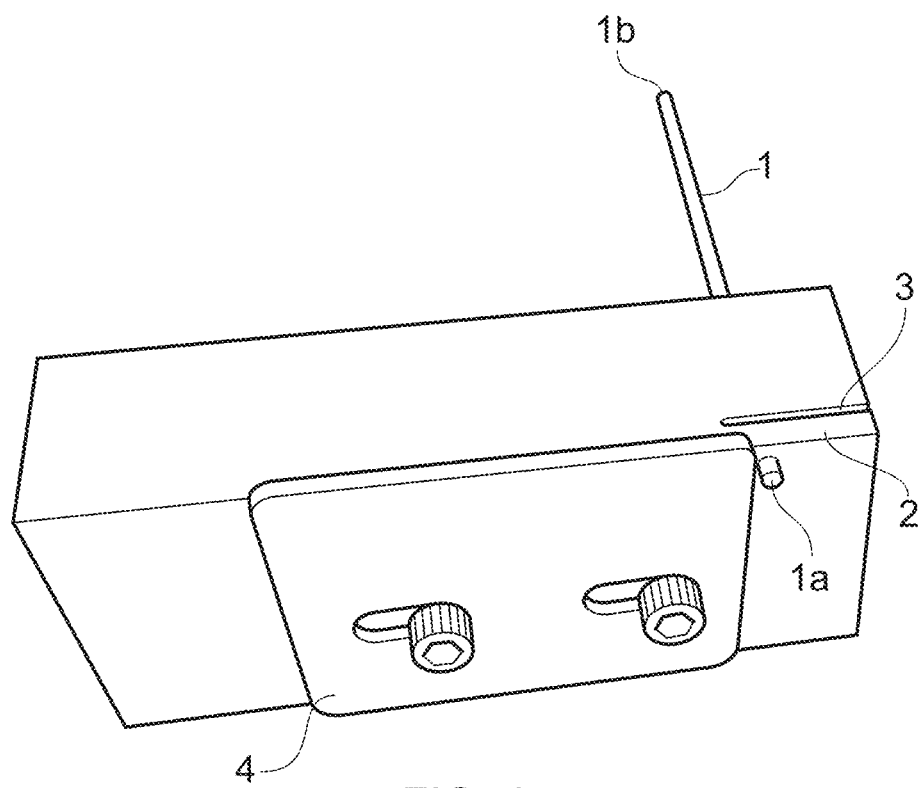
FIG. 4 illustrates a cured rod cutting method.

In a preferred embodiment, the cured dispersion is molded to form rods which in turn may be cut into desired lengths. A non-limiting example of how this can be carried out is illustrated in FIG. 4 where a cured rod 1 comprising a first end 1a and a second end 1b is fed into a channel defined within a metal block 2. The first end 1a of said cured rod 1 is allowed to protrude from said channel when an escapement gate 4 is in an open position as illustrated in FIG. 4. Metal block 2 also includes a guide slot 3 configured to accommodate a shear cutter such as a razor. When said first end 1a of said cured rod 1 protrudes from said channel a defined length can be obtained in a straightforward manner by moving escapement gate 4 in the path of the rod then passing a shear cutter through the guide slot 3. In a preferred embodiment, the cured molded dispersion comprises osmium and epoxy. In a preferred embodiment, the cured molded dispersion comprises tungsten and epoxy.

The Encapsulated Radioactive Source

In a preferred embodiment, the radioactive source is encapsulated (or "housed") in a "capsule". Preferably a length of the radioactive source of the invention as defined herein is encapsulated. Preferably said encapsulated length is obtained by means of the cutting step as described herein. The capsule is suitably any capsule suitable for housing of the radiation source of the present invention known in the art. A non-limiting example of such a known capsule is the CheckCap™ device, which comprises a radiation source surrounded by a tungsten cylindrical collimator. As described in more detail on the company website (www.check-cap.com), the CheckCap™ device is designed for use in diagnostic imaging of the large intestine using Compton backscattering of x-ray and gamma radiation emitted by the device.

EXAMPLE 1

Tungsten particles (average particle size 2.4 µm or 6.3 µm in separate experiments) were mixed into part A of Epotek 301 for two minutes using a stirring stick. Part B was then added followed by mixing. The concentration of tungsten particles was such that the final formulation contained 1 mg/µL tungsten. The mixture was immediately sonicated for 2 minutes and then subjected to a vacuum for 4 minutes with continual mixing. The composition was taken up into a syringe and mixed a final time via three repeat plunges with care taken to not introduce air bubbles. The composition was then delivered by syringe to a set of 10 Teflon tubes, 1.62 mm in diameter and 10 cm in length. In some experiments, the ends of the tubes were plugged with silicone grease. Prior to the addition of the particle-containing formulation, the Teflon tubes were inserted into glass rods to maintain a straight configuration. The Teflon tube containing glass rods were rotated under different conditions to achieve particle dispersion upon curing.

Figure 2:
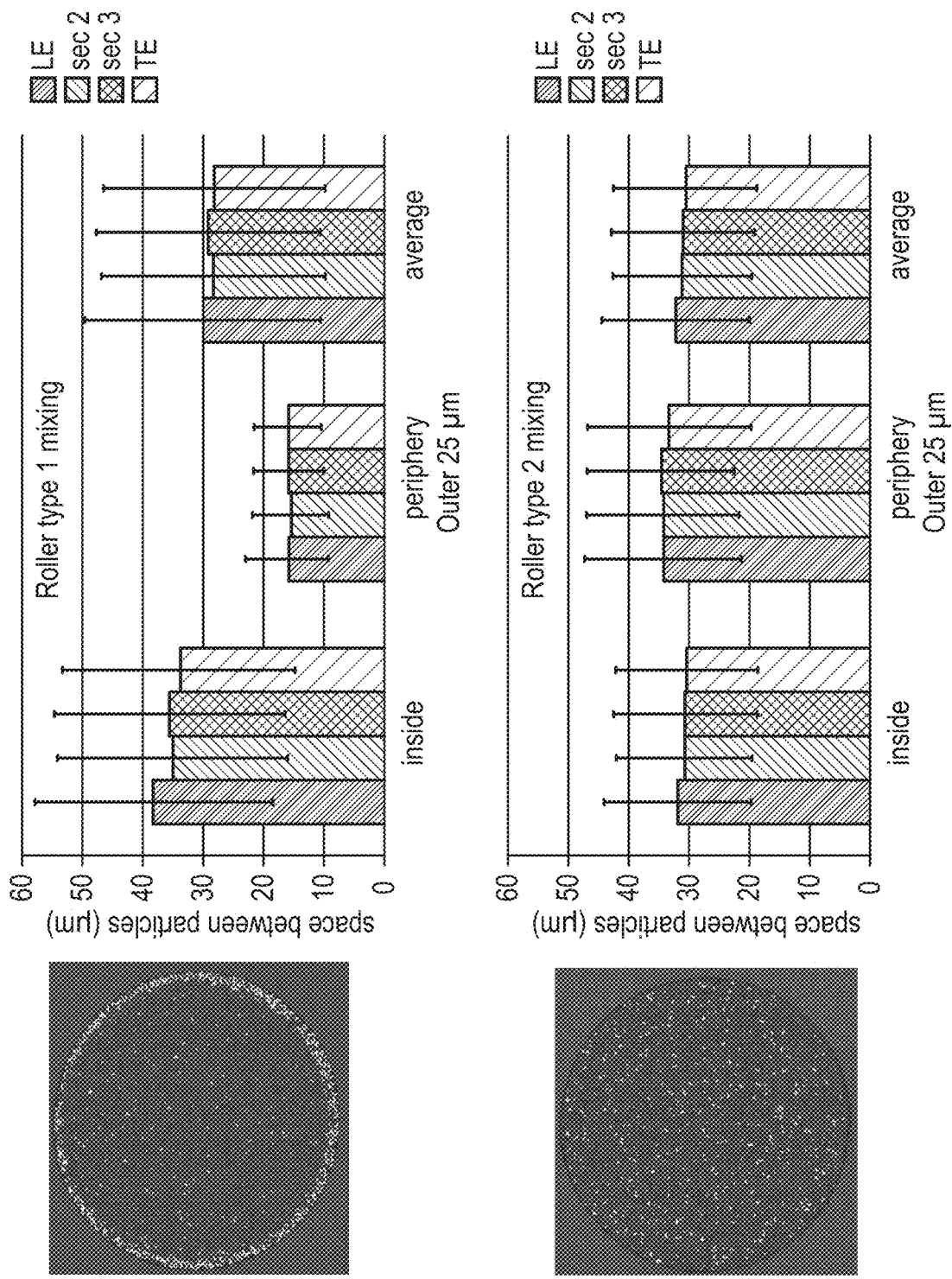
FIG. 2 illustrates dispersion of high density substance in the final cured matrix.

FIG. 2 shows the measurements for distance between particles for cured rod dispersions of tungsten particles with average size 6.3±4.0 µm obtained using (i) the mixing apparatus illustrated in FIG. 3B (top "Roller Type 1 mixing") and (ii) obtained using the mixing apparatus illustrated in FIG. 3C (bottom "Roller Type 2 mixing").

The invention claimed is:
1. A method for the preparation of a radiation source comprising the steps of:
   (i) immobilizing a radioactive substance in a support matrix to form a dispersion;
   (ii) curing a formulation in a mold to form cured rods wherein said formulation comprises a radioactive substance and a curable support matrix wherein said curing step comprises mixing said formulation in said mold; and
   (iii) cutting said cured rods to form at least one radiation source suitable for diagnostic imaging applications.
2. The method as defined in claim 1 wherein said formulation is obtained by mixing radioactive particles into said curable support matrix.
3. The method as defined in of claim 1 wherein said curable support matrix is a curable resin.
4. The method as defined in claim 1 wherein said mold is a cylindrically shaped mold.
5. The method as defined in claim 1 wherein the step of immobilizing a radioactive substance in a support matrix to form a dispersion further comprises
   mixing radioactive particles into a curable resin to create a formulation.
6. The method of claim 1, further comprising housing the cured rods within a cylindrical collimator.
7. The method of claim 6, wherein the cylindrical collimator comprises tungsten.
8. A method of preparing a radiation source comprising a radioactive substance wherein said radioactive substance is osmium and wherein said method comprises the following steps:
   (i) irradiating enriched $^{190}$Os to form a mixture comprising $^{191}$Os;
   (ii) oxidizing said mixture to produce gaseous $OsO_4$;
   (iii) trapping said gaseous $OsO_4$ in aqueous base followed by an osmium reduction step to precipitate osmate as osmate particles;
   (iv) formulating said osmate particles into an epoxy matrix to form a formulation;
   (v) placing said formulation into a mold;
   (vi) curing said formulation in said mold into epoxy rods wherein said curing step comprises mixing said formulation in said mold; and
   (vii) cutting said epoxy rods to form cut epoxy rods.

* * * * *